(12) United States Patent
Linford et al.

(10) Patent No.: US 12,253,220 B2
(45) Date of Patent: Mar. 18, 2025

(54) METHOD AND SYSTEM FOR ANOMALY DETECTION FOR A PUMPED PIPELINE

(71) Applicant: Syrinix Ltd, Hethel (GB)

(72) Inventors: Paul Linford, Hethel (GB); Benjamin Smither, Hethel (GB); Alexander Forbes, Hethel (GB)

(73) Assignee: SYRINIX LTD, Norfolk (GB)

( * ) Notice: Subject to any disclaimer, the term of this patent is extended or adjusted under 35 U.S.C. 154(b) by 218 days.

(21) Appl. No.: 18/046,535

(22) Filed: Oct. 14, 2022

(65) Prior Publication Data

US 2023/0204165 A1 Jun. 29, 2023

(30) Foreign Application Priority Data

Oct. 14, 2021 (GB) .................................. 2114709

(51) Int. Cl.
*F17D 5/06* (2006.01)
*G08B 21/18* (2006.01)

(52) U.S. Cl.
CPC ............. *F17D 5/06* (2013.01); *G08B 21/187* (2013.01)

(58) Field of Classification Search
CPC ....... F17D 5/06; G08B 21/187; G01M 3/2807
See application file for complete search history.

(56) References Cited

U.S. PATENT DOCUMENTS

| 5,237,310 | A | * | 8/1993 | Smith | ...................... | G07C 3/00 |
| | | | | | | 417/63 |
| 2003/0066340 | A1 | * | 4/2003 | Hassenflug | ............... | G01F 1/28 |
| | | | | | | 73/46 |
| 2010/0150737 | A1 | * | 6/2010 | Anderson | ............... | G01F 23/22 |
| | | | | | | 702/6 |
| 2018/0209124 | A1 | * | 7/2018 | Yokokawa | ................ | F17D 5/06 |
| 2020/0032494 | A1 | * | 1/2020 | Trescott | ................ | G01F 15/005 |
| 2020/0093033 | A1 | * | 3/2020 | Lunsman | ............ | G01M 3/2815 |

OTHER PUBLICATIONS

Zhiguo Yuan et al., "Sweating the assets—the role of instrumentation, contol and automation in urban water systems", Water Research, Mar. 3, 2019, pp. 381-402.
European Search Report for corresponding EP Application No. EP 22275136.4, 9 pages, dated Mar. 17, 2023.
Ovarro Connecting Technologies, Preventing rising main pollution through machine learning:, published and retrieved from https://www.processindustryinformer.com/wp-content/uploads/2021/09/burstdetect-presentation.pdf, Sep. 2021 (23 pages).
Ovarro Connecting Technologies, "Ovarro pollution early-warning technology chosen by Anglian Water," published and retrieved from https://swan-forum.com/wp-content/uploads/2023/04/Ovarro-Anglian-Water-selects- BurstDetect-2022-1.pdf, Jan. 2022 (2 pages).
Oliver Grievson, "WIPAC Monthly," published and retrieved from https://www.slideshare.net/slideshow/wipac-monthly-May 2022/251863200, May 2022 (20 pages).

\* cited by examiner

*Primary Examiner* — Francis C Gray
(74) *Attorney, Agent, or Firm* — Leason Ellis LLP (57) ABSTRACT

A method and system for detecting an anomaly in a pumped pipeline is disclosed. A data stream is received over time on operation of the pump and pump start and pump stop event data is obtained from the data stream. For each pair in time of a pump start event and preceding pump stop event in the data stream flow is calculated and compared to expected flow. Variation between calculated flow and expected flow is recorded as an exception and an alarm is triggered in dependence on the exception.

11 Claims, 6 Drawing Sheets

METHOD AND SYSTEM FOR ANOMALY DETECTION FOR A PUMPED PIPELINE

CROSS-REFERENCE TO RELATED APPLICATION

This application claims priority under 35 U.S.C. § 119 to GB Patent Application No. 2114709.5 filed Oct. 14, 2021, the contents of which are hereby incorporated by reference as if set forth in its entirety herein.

FIELD OF THE INVENTION

The present invention concerns a method and system for anomaly detection for a pumped pipeline. Embodiments are applicable to any pipeline but are particularly suitable for detection of anomalies such as bursts in rising mains (a pumped pipeline carrying wastewater often also referred to as a "Forced Main").

BACKGROUND TO THE INVENTION

Pipelines are often installed in locations that are difficult or impossible to access after installation—for example they may be underground, built upon or simply span remote areas that are infrequently visited.

However, pipelines are also typically long-term projects. They are expected to be used for years, possibly decades or more.

Maintenance of pumped pipelines used to be reactive and based on reports from users or those in the local area of leaks. However, there is a desire to be pro-active and identify issues before they become major incidents.

STATEMENT OF INVENTION

According to an aspect of the present invention, there is provided a method of detecting an anomaly in a pumped pipeline, the pipeline having a fluid to be pumped from a sump by a pumping system having a predetermined high and low level setpoint, the pumping system having a pump configured to start pumping when fluid in the sump is at the high level and stop pumping when the fluid is at the low level, the method comprising:
  receiving a data stream over time on operation of a pump that pumps the fluid from the sump;
  obtaining pump start and pump stop event data from the data stream;
  for each pair in time of a pump start event and preceding pump stop event in the data stream:
    determining from the pump start and pump stop event data a duration of time that the pump is off, $D_{off}$;
    determining from the start and stop event data a duration of time that the pump is on, $D_{on}$;
    calculating flow from $D_{off}$ and $D_{on}$
    storing the calculated flow in a data repository;
    comparing the calculated flow to an expected flow;
    recording in the data repository an exception upon the variation between calculated flow and expected flow exceeding a predetermined threshold; and
    triggering an alarm in dependence on the exception.

The method may further comprise triggering an alarm upon a predetermined number of exceptions being recorded within a predetermined time period.

The method may further comprise triggering an alarm upon a predetermined number of exceptions being recorded with a similar variation.

The method may further comprise receiving a plurality of data streams, each from a different pump, method further comprising joining the data streams together and obtaining a time ordered sequence of start and stop event data from the joined data streams.

The expected duration of time that pump is on and off may be predetermined (calculated; estimated from pumping system characteristics etc).

The expected duration of time that pump is on and off may be obtained from a machine learning system.

The expected duration of time that pump is on and off may be learnt from data stream over time (and preferably obtained from the data recorded in the data repository).

The method may further comprise plotting each pair on a scatter plot, the steps of comparing comprising identifying a point on the scatter plot outside normal operating range.

The method may further comprise registering a pipeline burst exception upon the calculated flow being exceeding expected flow by greater than or equal to a predetermined amount.

The method may further comprise receiving an anomaly decision from a pressure monitoring system monitoring the pipeline and generating an alarm upon the anomaly decision agreeing with the exception.

According to another aspect of the present invention, there is provided an anomaly detection system for a pumped pipeline, the pipeline having a fluid to be pumped from a sump by a pumping system having a predetermined high and low level setpoint, the pumping system having a pump configured to start pumping when fluid in the sump is at the high level and stop pumping when the fluid is at the low level, the anomaly detection system comprising:
  a pipeline flow data repository;
  an input interface configured to receive a data stream over time on operation of the pump;
  a processor configured to execute computer program code for detecting anomalies from the data stream, the computer program code including:
  computer program code configured to obtain pump start and pump stop event data from the data stream;
  computer program code configured, for each pair in time of a pump start event and preceding pump stop event in the data stream, to:
    determine from the pump start and pump stop event data a duration of time that the pump is off, $D_{off}$;
    determine from the start and stop event data a duration of time that the pump is on, $D_{on}$;
    calculate flow from $D_{off}$ and $D_{on}$;
    store the calculated flow in the data repository;
    compare the calculated flow to an expected flow;
    record in the data repository an exception upon the variation between calculated flow and expected flow exceeding a predetermined threshold; and
    an output interface configured to trigger an alarm in dependence on the exception.

Although the flow that is calculated and monitored is preferably the pumping system output flow, flow of individual pumps and also input flow to the sump can also be calculated and monitored.

Embodiments of the present invention are directed to methods and systems that are particularly applicable to anomaly detection (such as detection of bursts, leaks and blockages) for a point-to-point pumped pipeline. The embodiments can be used in any similar types of pumped pipeline but for the purposes of explanation a "rising main" is used here. In the UK, a "rising main" is a pumped pipeline carrying wastewater (in the USA, for example, it is often referred to as a "Forced Main").

Rising mains are relatively simple hydraulic systems, transporting wastewater from a collection point (a sump, for example) to either another collection point or to a treatment facility and therefore lend themselves well to an explanation of the embodiments and accompanying techniques. However, embodiments can be used for more complex pipelines.

The applicant's existing patents and applications in this area (such as GB2586775, also published as US 2020/0393326, incorporated herein by reference in their entireties) use pressure data collected from a pressure monitoring point at the pump station, details of the pump characteristics and the topology of the pipeline to detect a burst rising main. While this generally works well there are some shortcomings:
- Requires the installation of a pressure monitor at the pump station;
- Can generate a small number of false positives and;
- Can miss some smaller bursts or bursts towards the end of the main;
- Is better suited to simple systems where the pumps run at a fixed speed and the delivery is generally uphill.

In embodiments of the present invention, anomalies such as bursts can be detected using only data that is available from pumps. While this may preferably be in the form of SCADA (supervisory control and data acquisition) data, thew format and content of the data stream from the pump does not matter as long as timing of pump on and pump off events can be identified.

Embodiments of the present invention can leverage a pressure monitor such as those described in the applicants existing patents and applications, but does not require one. Where a pressure monitor is present, the pressure data can be taken into account during analysis to form a hybrid system that reduces false alarms and mitigating the weaknesses of using pressure or flow data alone.

It will be noted that SCADA (Supervisory Control And Data Acquisition) data from a pumping system typically includes the start and stop times of each pump in the pump station reported multiple times per day. In some embodiments, start/stop data can be obtained, derived or refined from SCADA data or from non-SCADA data sources.

The inventors of the present application have identified that given the knowledge that a pumping system operates between high and low setpoints of a sump, bursts (and other anomalies such as blockages) can be identified from pump on and off event data without knowing what those setpoints are. If information on the setpoints and the volume of the sump is known, more informative information can be provided (such as actual change in flow in standard measurement units in the pipeline rather than a relative value). Furthermore, embodiments of the present invention are insensitive to numbers of pumps or operating arrangements of those pumps. The data stream received can be a single stream for the entire pumping system or it can be individual streams that embodiments then combine.

Embodiments are sensitive to changes in the sump level set points—technicians looking to optimise a pump station's performance have been known to change these set points during a site visit. However, while these are identified as exceptions in embodiments of the present invention, they can be flagged and queries or evaluated and/or used to adapt and adjust the learnt "normal" operation of the pumping system.

Adaptive well levels could cause issues—i.e. on-site controls automatically changing set points based on inflow or weather or energy spot pricing. In such situations, other data streams (such as weather data) can be utilised to identify issues. Machine learning systems may be leveraged to process identified anomalies along side data from other sources in order to differentiate between pipeline fault events and external events impacting the pipeline.

If the main already has a burst site (so the pipeline is leaking) when the monitoring system is first activated, this will be incorporated into the normal operation and will never create and alarm. Use of the hybrid system described below can avoid this.

BRIEF DESCRIPTION OF THE DRAWINGS

Embodiments of the present invention will now be described, by way of example only and with reference to the accompanying drawings in which.

DETAILED DESCRIPTION

Figure 1:
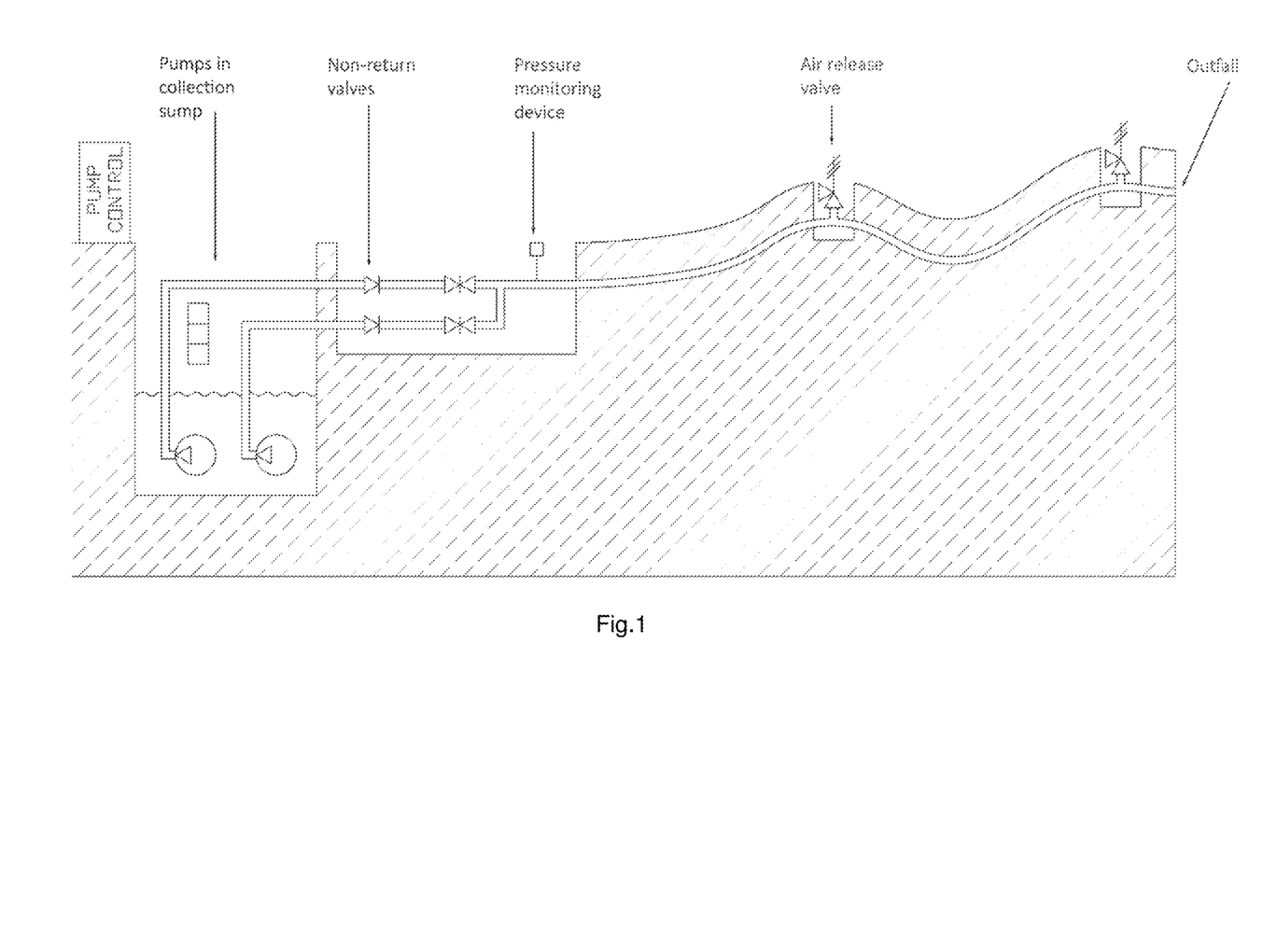
FIG. 1 is a schematic diagram of a rising main pipeline for which embodiments of the present invention may be used.

FIG. 1 is a schematic diagram of a rising main pipeline for which embodiments of the present invention may be used.

Such pipelines include an inflow from a collection system (not shown in the drawings), a sump, well or similar fluid holding vessel (which may be enclosed or open), a pumping system having a pump that may be submersible or dry and arranged to pump from the sump into the pipes of the pipeline.

Typical pumping systems include a pump control system with a sump level sensor that has a predetermined high and low level setpoint, the pumping system is configured to start the pump when fluid in the sump is at the high level and stop the pump when the fluid is at the low level. Often, there is more than one pump in the pumping system and these may be operated sequentially or in parallel. Where there is more than one pump, all of them operate on the same sump and with reference to the same high and low level setpoints of the sump.

While other features may be implementation dependent, a pipeline may also optionally include a non-return valve on each pump, a manifold joining together the output from each pump, air valves in the pipeline and a delivery point at the outfall, the destination end of the pipeline, (typically the treatment works or another sump).

Existing pump control systems are typically configured to:
- Turn one or more pumps on at the sump "high" level (a pump start event in the SCADA data)
- Turn the pumps off at the sump low level (a pump stop event in the SCADA data)
- Run a different pump each time to level the pump wear
- On some occasions, upon higher inflow to the sump for example, turn on more than one pump Assuming the collection sump has a cross-sectional area A. The pump is turned on at the sump high-level setting and is turned off at the sump low-level setting. The fluid height difference between the high and low settings is h and hence the volume pumped out is hA.

Embodiments of the present invention utilise the knowledge that the volume in the sump between the high (start) and low (stop) levels is fixed with a drop in sump level of h between high and low level. hA can be expressed as a percentage (i.e. start pumping at 60% full, stop at 40% full), in which case the calculated flow will be expressed as % per second. If on the other hand, hA is known or can be calculated, for example in litres, then resulting flow ($Q_p$) will be in litres/sec.

From this knowledge, and pump event data stream that includes (or from which can be derived) the pump start ($t_{on}$) and pump stop times ($t_{off}$), the duration of time a pump runs for and also that the pumping system is off (irrespective of number of pumps) following can be determined:

$D_{off}$=time duration pumps are off=time to fill the sump=indication of inflow ($Q_i$)

$$Q_i = \frac{hA}{D_{off}}$$

$D_{on}$=time duration pumps are on=time to pump the sump down=indication pump flow rate $Q_p$+ continuing inflow $Q_i$ $$Q_p - Q_i = \frac{hA}{D_{on}}$$

These can be combined by substituting $Q_i$ and as a result, data on inflow to the sump is not needed:

$$Q_p = \frac{hA}{D_{off}} + \frac{hA}{D_{on}} = hA\left(\frac{1}{D_{off}} + \frac{1}{D_{off}}\right)$$

$Q_p$ is the flow rate of the pump:

$$Q_p = hA\left[\frac{1}{D_{on}} + \frac{1}{D_{off}}\right] \quad (1)$$

The run-time durations are therefore at a minimum when the inflow is very low. By monitoring the run-time and learning the normal minimum run-time durations for any given sump-pump-main system, abnormal behaviour can be detected. For example, run-times below the expected (learnt) minimum can indicate a burst rising main. Abnormally long run-times can indicate a blockage or failing pump.

As discussed above, hA, is a physical parameter of a particular sump construction and hence is a constant value. $Q_p$ is a characteristic of the pump and is therefore also a constant value.

If the pipeline has a burst, the pump run-time, $D_{on}$, will be shorter and hence an increase in the $$\frac{1}{D_{on}} + \frac{1}{D_{off}}$$

term in equation (1) above.

Figure 2:
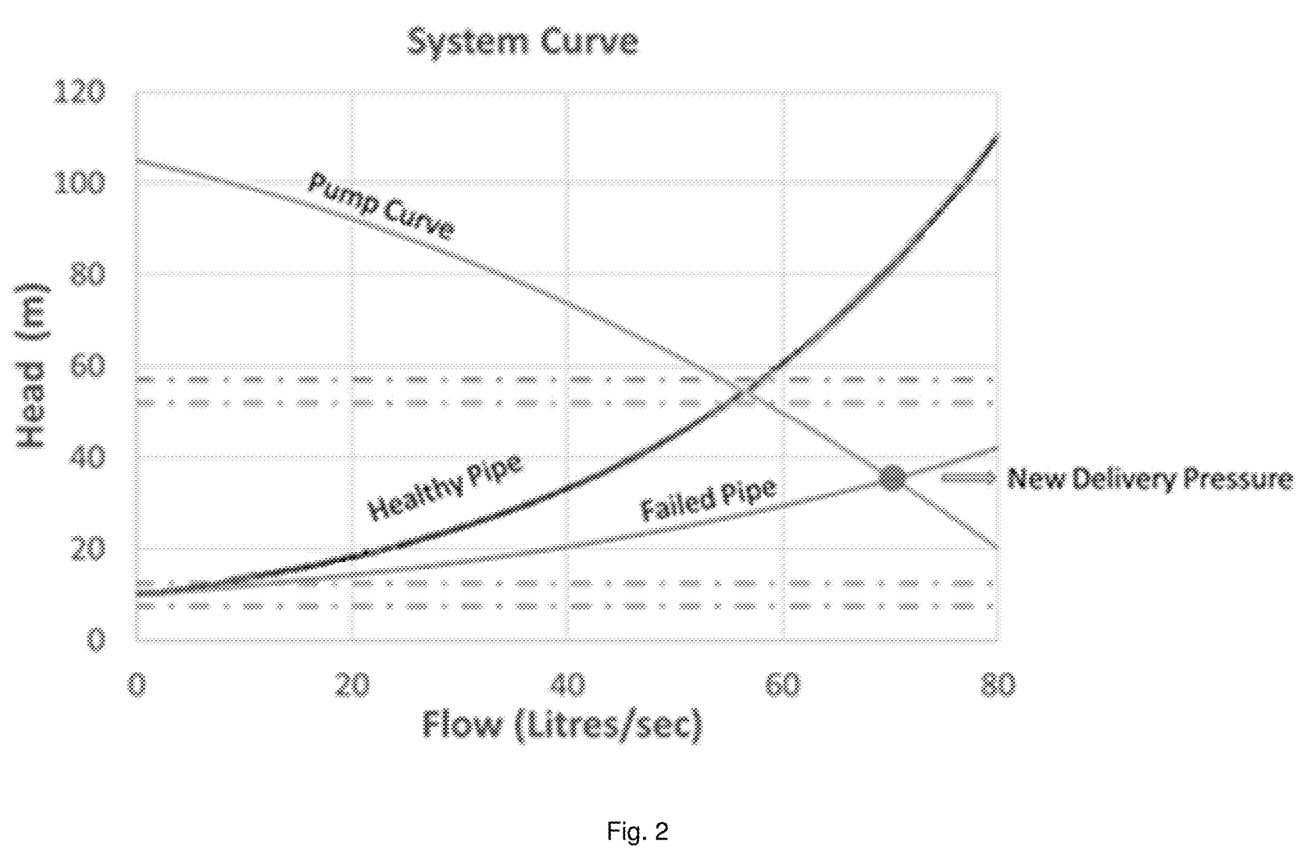
FIG. 2 is a plot showing a pump system curve and flow within a pipeline.

The reason a burst causes a reduction in run-time duration and increase in pump flow rate can be understood from the system curve, FIG. 2. When a pipeline bursts, it becomes less restrictive, and the equilibrium point between the pump and the pipeline moves to a new higher flow and lower pressure point as shown by the green dot on the system curve.

The pump only has to lift the fluid to the burst location rather than all the way to the outfall. The position of the dot in FIG. 2 changes with the location of the burst site along the main.

Figure 3:
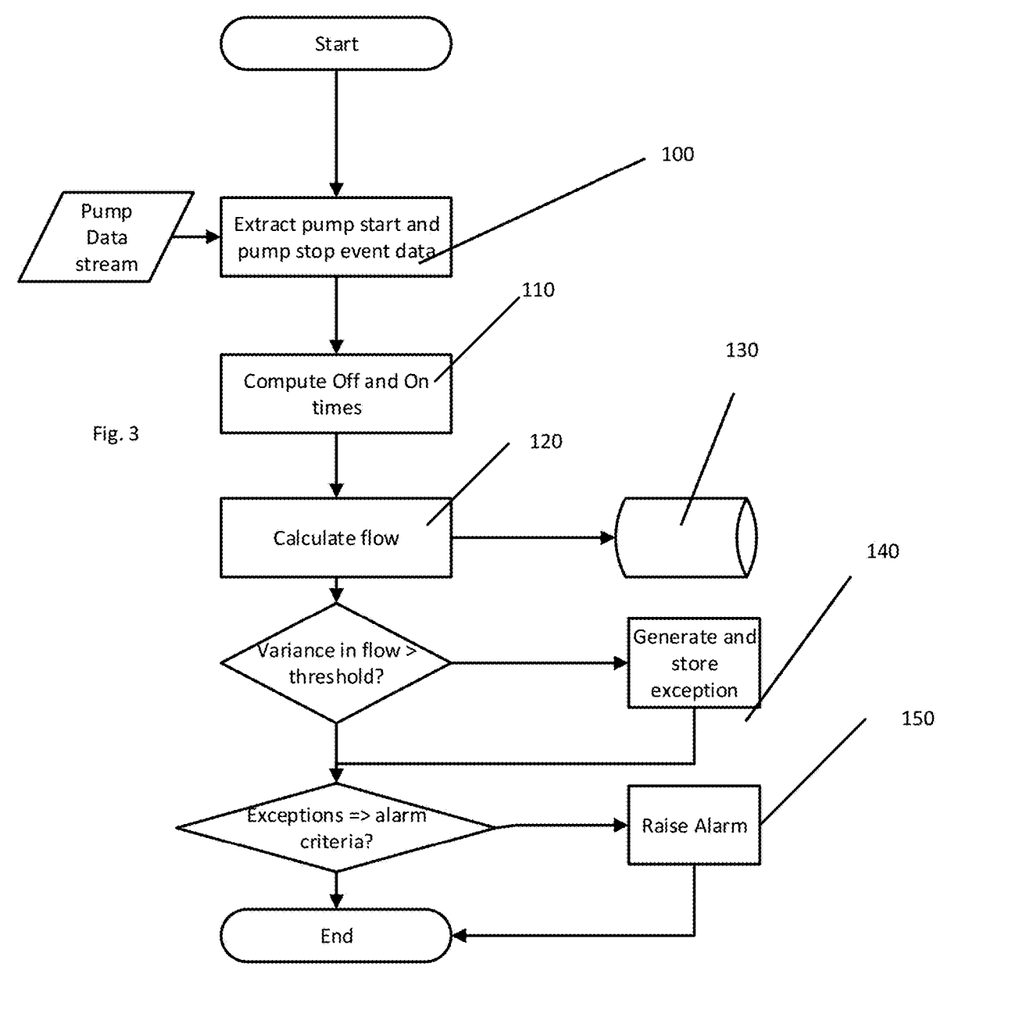
FIG. 3 is a flow diagram of a method according to an embodiment.

FIG. 3 is a flow diagram of an anomaly detection method according to an embodiment.

In step 100, pump start and pump stop event data is extracted from a received data stream.

In step 110 the method iterates through the pump start and stop time data set and for each pump start event and preceding (in time) pump stop event, computes the Off-Duration ($D_{off}$) set (difference between an Off event time and subsequent On event time) and the Run-Duration ($D_{on}$) set (difference between an On event time and subsequent Off event time).

In step 120, flow (actual or relative) is calculated and stored, in step 130, in a data repository.

If the flow varies more than a predetermined threshold compared to expected flow for the pipeline (which as discussed above may be learnt, calculated from a model or predicted by a machine learning system), an exception is raised and preferably stored in the data repository against the flow data in step 140.

In step 150, an alarm is raised in dependence on exceptions (for example, if there are a sufficient number within a predetermined time period and/or a similar number of exceptions with similar variation of a sequence of exceptions identified matching a particular fault pattern (such as a leak increasing in magnitude).

Alarms may, for example, be in the form of emails or other communications, an API push to operations team or other alarm mechanisms. An example alarm may be, for example when outflow lower than −0.225% per sec (indicative of a burst).

Figure 3A:
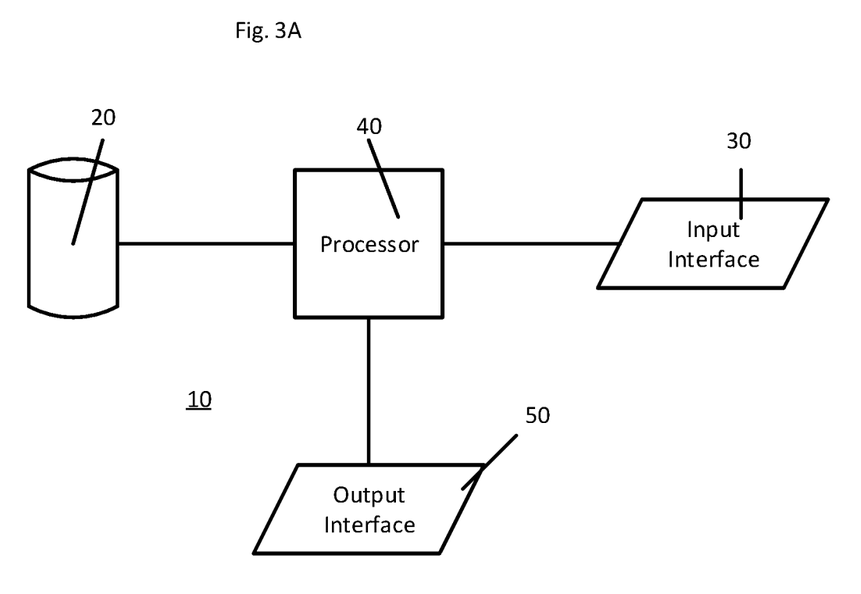
FIG. 3A is a schematic diagram of an anomaly detection system for a pumped pipeline.

FIG. 3A is a schematic diagram of an anomaly detection system for a pumped pipeline, the pipeline having a fluid to be pumped from a sump by a pumping system having a predetermined high and low level setpoint, the pumping system having a pump configured to start pumping when fluid in the sump is at the high level and stop pumping when the fluid is at the low level. The anomaly detection system 10 comprises:

a pipeline flow data repository 20;
an input interface 30 configured to receive a data stream over time on operation of the pump;
a processor 40 configured to execute computer program code for detecting anomalies from the data stream, the computer program code including:
computer program code configured to obtain pump start and pump stop event data from the data stream;
computer program code configured, for each pair in time of a pump start event and preceding pump stop event in the data stream, to:
determine from the pump start and pump stop event data a duration of time that the pump is off, $D_{off}$;
determine from the start and stop event data a duration of time that the pump is on, $D_{on}$;
calculate flow from $D_{off}$ and $D_{on}$;
store the calculated flow in the data repository;
compare the calculated flow to an expected flow;

record in the data repository an exception upon the variation between calculated flow and expected flow exceeding a predetermined threshold; and an output interface 50 configured to trigger an alarm in dependence on the exception.

Figure 4:
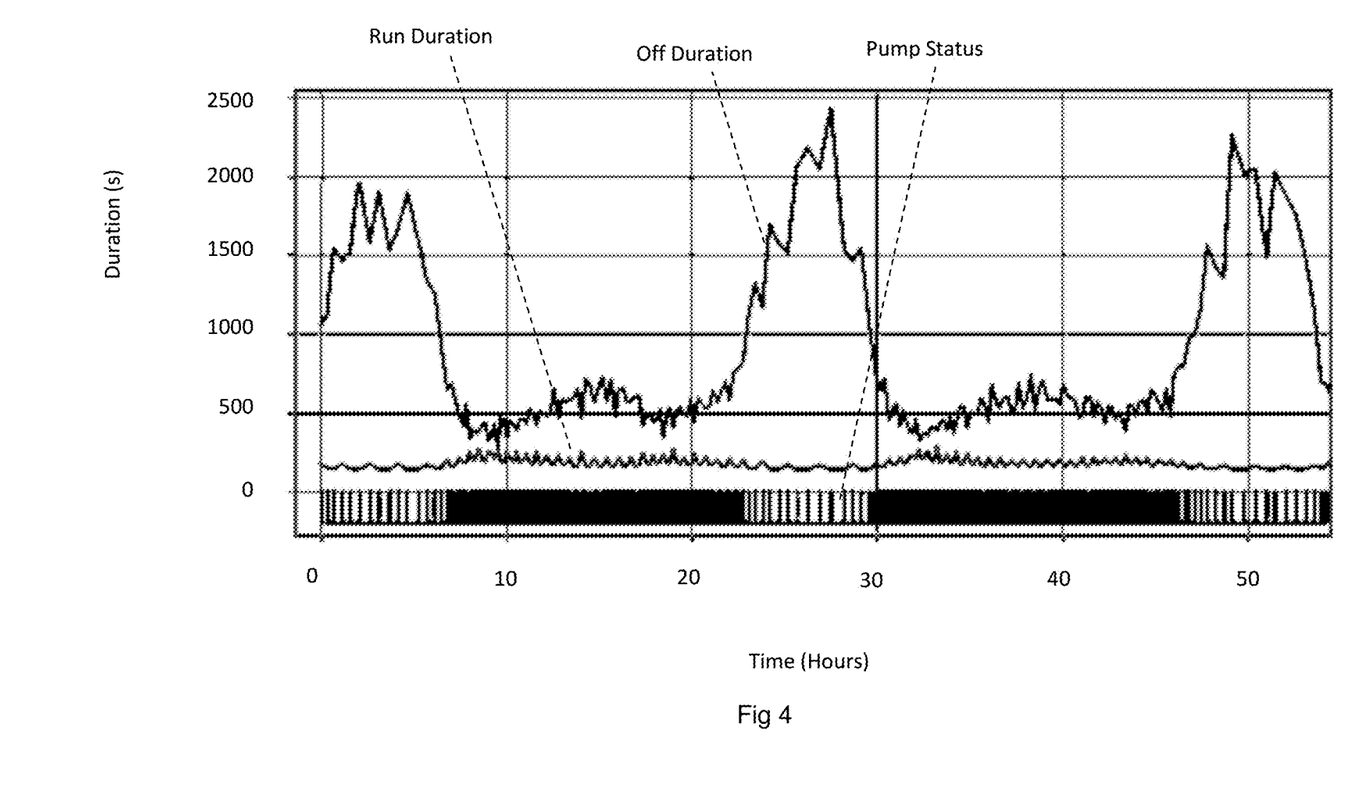
FIG. 4 is a plot showing pump operation.

FIG. 4 is a plot of pump run status (3 pumps), calculated run durations and off durations.

Where the pumping system does not export its data, embodiments may include appropriate hardware and infrastructure to retrieve a regular export (for example every 15 minutes) of data such as SCADA data. Preferably, the anomaly detection method is performed by a monitoring system—it may be centrally located or may be dedicated to a particular pipeline (or may be a distributed system with local monitoring systems reporting to a central system).

Embodiments may also cleanse the pump start and stop data to remove repeated points.

Typically, each pump in a pumping system has its own stream of start and stop times. In such cases, embodiments joined the data streams together to a single time-ordered series of start and stop times. Note that the preceding stop event may not be from the same pump as the start event in a pair—it is the overall system that is being evaluated not individual pumps. Where multiple pumps run at the same time, these events may be combined and the fact there is combined running taken into account when checking for variation compared to normal timings.

Figure 5:
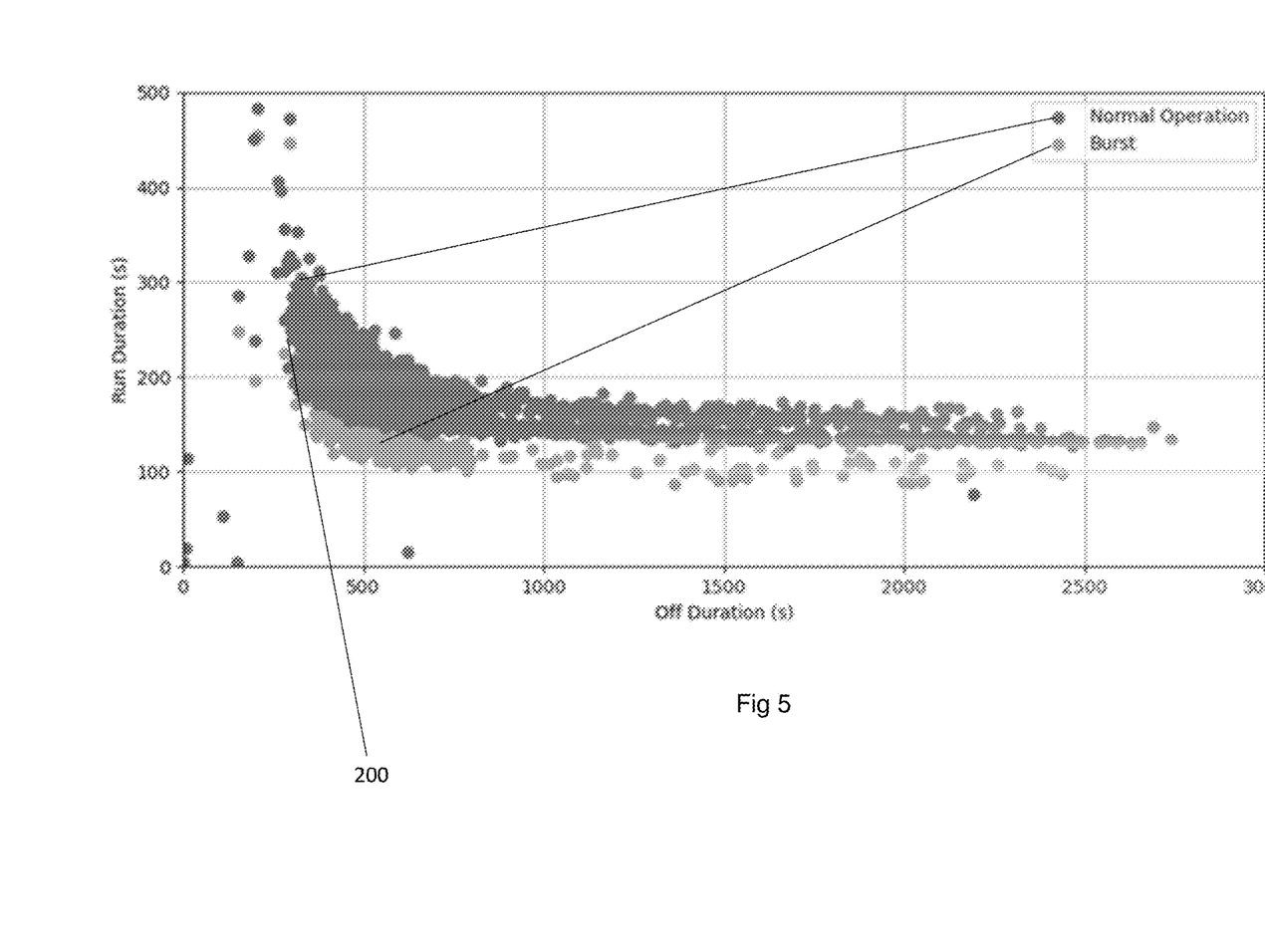
FIG. 5 is a plot showing pump run and off duration.

In selected embodiments, output may be made to a display to visually highlight potential anomalies. In such an embodiment, the Off-Duration set (x-axis variable) may be plotted against the Run-Duration set (y-axis variable) on a scatter plot (FIG. 5). The plot then shows the normal operation range and variance of the sump-pump-main system being monitored.

The 1/x nature of this relationship, shown in equation (1) is clear from the plot.

Bursts are indicated by a new cluster of points on the scatter plot appearing with an unusually low run time (FIG. 5), shown as zone 200. From equation (1) it is possible to learn, by monitoring the system for a while, or compute, an alarm threshold for $Q_p$ and this will be positioned within the highlighted zone 200 in FIG. 5. The data does not need to be shown on a plot to identify anomalies—calculated pump flow can also be monitored for variance as discussed above.

As discussed above, embodiments may be combined with other detection methods and systems such as that described in the applicant's other patent applications. Combining detection based on pump event data such as the SCADA data as described above with pressure (as described in GB2586775 and US 2020/0393326) based burst detection methods enables reduction of false-positives. Each algorithm could operate independently with the final decision on whether to issue a burst alarm being decided by voting logic combining the two alarm signals (or weighting or some heuristic approach) and associated metadata (which might include, as an example, meteorological data that would indicate, for example, inflow increase due to road run off).

A hybrid system like this:

Is more expensive to implement as a pressure monitoring point is also required

Reduces time for positive identification of burst event

Reduces false positives due to non-burst failures or system configuration changes Improves the sensitivity of the detector to small bursts Improves the sensitivity to the detector to bursts near the outfall end of the pipe An advanced alarm generation method could also include the pressure data and checking of operating point on system curve (i.e. with a threshold on both needing to be met to trigger an alarm).

It is to be appreciated that certain embodiments of the invention as discussed above may be incorporated as code (e.g., a software algorithm or program) residing in firmware and/or on computer useable medium having control logic for enabling execution on a computer system having a hardware/computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A method of detecting an anomaly in a pumped pipeline, the pipeline having a fluid to be pumped from a sump by a pumping system having a predetermined high and low level setpoint, the pumping system having a pump configured to start pumping when fluid in the sump is at the high level and stop pumping when the fluid is at the low level, the method comprising:

receiving a data stream over time on operation of the pump;

obtaining pump start and pump stop event data from the data stream;

for each pair in time of a pump start event and preceding pump stop event in the data stream:

determining from the pump start and pump stop event data a duration of time that the pump is off, $D_{off}$;

determining from the start and stop event data a duration of time that the pump is on, $D_{on}$;

calculating flow from $D_{off}$ and $D_{on}$;

storing the calculated flow in a data repository;

comparing the calculated flow to an expected flow;

recording in the data repository an exception upon the variation between calculated flow and expected flow exceeding a predetermined threshold; and triggering an alarm in dependence on the exception.

2. The method of claim 1, further comprising triggering an alarm upon a predetermined number of exceptions being recorded within a predetermined time period.

3. The method of claim 1, further comprising triggering an alarm upon a predetermined number of exceptions being recorded with a similar variation.

4. The method of claim 1, further comprising receiving a plurality of data streams, each from a different pump, method further comprising joining the data streams together and obtaining a time ordered sequence of start and stop event data from the joined data streams.

5. The method of claim 1, wherein the expected duration of time that pump is on and off is predetermined.

6. The method of claim 1, wherein the expected duration of time that pump is on and off is obtained from a machine learning system.

7. The method of claim 1, wherein the expected duration of time that pump is on and off is learnt from data stream over time.

8. The method of claim 1, further comprising plotting each pair on a scatter plot, the steps of comparing comprising identifying a point on the scatter plot outside normal operating range.

9. The method of claim 1, further comprising registering a pipeline burst exception upon the calculated flow being exceeding expected flow by greater than or equal to a predetermined amount.

10. The method of claim 1, further comprising receiving an anomaly decision from a pressure monitoring system monitoring the pipeline and generating an alarm upon the anomaly decision agreeing with the exception.

11. An anomaly detection system for a pumped pipeline, the pipeline having a fluid to be pumped from a sump by a pumping system having a predetermined high and low level setpoint, the pumping system having a pump configured to start pumping when fluid in the sump is at the high level and stop pumping when the fluid is at the low level, the anomaly detection system comprising:
  a pipeline flow data repository;
  an input interface configured to receive a data stream over time on operation of the pump;
  a processor configured to execute computer program code for detecting anomalies from the data stream, the computer program code including:
  computer program code configured to obtain pump start and pump stop event data from the data stream;
  computer program code configured, for each pair in time of a pump start event and preceding pump stop event in the data stream, to:
    determine from the pump start and pump stop event data a duration of time that the pump is off, $D_{off}$;
    determine from the start and stop event data a duration of time that the pump is on, $D_{on}$;
    calculate flow from $D_{off}$ and $D_{on}$;
    store the calculated flow in the data repository;
    compare the calculated flow to an expected flow;
    record in the data repository an exception upon the variation between calculated flow and expected flow exceeding a predetermined threshold; and
  an output interface configured to trigger an alarm in dependence on the exception.

* * * * *